(12) United States Patent
Sahashi (10) Patent No.: US 10,414,308 B2
(45) Date of Patent: Sep. 17, 2019

(54) VEHICLE SEAT AND MANUFACTURING METHOD THEREOF

(71) Applicant: TOYOTA BOSHOKU KABUSHIKI KAISHA, Aichi-ken (JP)

(72) Inventor: Hideo Sahashi, Aichi-ken (JP)

(73) Assignee: TOYOTA BOSHOKU KABUSHIKI KAISHA, Aichi-ken (JP)

(*) Notice: Subject to any disclaimer, the term of this patent is extended or adjusted under 35 U.S.C. 154(b) by 0 days.

(21) Appl. No.: 15/895,758

(22) Filed: Feb. 13, 2018

(65) Prior Publication Data

US 2018/0257528 A1 Sep. 13, 2018

(30) Foreign Application Priority Data

Mar. 9, 2017 (JP) ................. 2017-044662

(51) Int. Cl.
| | |
|---|---|
| B60N 2/70 | (2006.01) |
| B60N 2/64 | (2006.01) |
| B60N 2/58 | (2006.01) |
| B60N 2/90 | (2018.01) |
| B60N 2/20 | (2006.01) |

(52) U.S. Cl.
CPC ............ B60N 2/7017 (2013.01); B60N 2/20 (2013.01); B60N 2/58 (2013.01); B60N 2/643 (2013.01); B60N 2/646 (2013.01); B60N 2/986 (2018.02)

(58) Field of Classification Search
CPC ...... B60N 2/7017; B60N 2/986; B60N 2/646; B60N 2/643
See application file for complete search history.

(56) References Cited

U.S. PATENT DOCUMENTS

| | | | |
|---|---|---|---|
| 2006/0214485 A1* | 9/2006 | Brockschnieder | B60N 2/5816 297/228.11 |
| 2016/0244018 A1* | 8/2016 | Zimmermann | B60R 21/207 |
| 2017/0158088 A1* | 6/2017 | Pike | B60N 2/646 |

FOREIGN PATENT DOCUMENTS

| | | | | |
|---|---|---|---|---|
| CA | 2354933 A1 | * | 2/2002 | ......... B29C 44/0469 |
| DE | 102008047698 A1 | * | 3/2010 | ......... B60N 2/42709 |
| DE | 102009012693 A1 | * | 10/2010 | ............. B60N 2/914 |
| EP | 3020600 A1 | * | 5/2016 | ............... B60N 2/72 |
| EP | 3034353 A1 | * | 6/2016 | ............... B60N 2/70 |
| FR | 2615714 A1 | * | 12/1988 | ............... A47C 7/18 |
| JP | 2001070083 A | * | 3/2001 | .......... B60N 2/7017 |
| JP | 2002159376 A | * | 6/2002 | .......... B60N 2/7017 |
| JP | 4763275 | | 6/2006 | |
| JP | 4300377 B2 | * | 7/2009 | |

(Continued)

*Primary Examiner* — Timothy J Brindley
(74) *Attorney, Agent, or Firm* — Greenblum & Bernstein, P.L.C.

(57) ABSTRACT

A vehicle seat including: a seat cushion including: a seating part formed of an elastic body; a side part formed of an elastic body harder than the elastic body forming the seating part; and a rear part; and a seat back including: a backrest part formed of an elastic body; a side part formed of an elastic body harder than the elastic body forming the backrest part; and a rotation-center-side end part; wherein the rear part and the rotation-center-side end part are in contact with each other, and wherein at least one of (i) at least one side portion of the rear part and (ii) at least one side portion of the rotation-center-side end part is formed of an elastic body softer than the elastic body forming the side part of the seat cushion and the elastic body forming the side part of the seat back.

8 Claims, 6 Drawing Sheets

(56) References Cited

FOREIGN PATENT DOCUMENTS

| | | | | |
|---|---|---|---|---|
| WO | WO-2006102751 A1 | * | 10/2006 | ............... A47C 7/18 |
| WO | WO-2007031952 A2 | * | 3/2007 | ........... B60N 2/5891 |
| WO | WO-2012039042 A1 | * | 3/2012 | ........... B60N 2/4235 |
| WO | WO-2015129824 A1 | * | 9/2015 | ............... B60N 2/68 |
| WO | WO-2017104605 A1 | * | 6/2017 | ............... B60N 2/90 |

* cited by examiner

VEHICLE SEAT AND MANUFACTURING METHOD THEREOF

CROSS-REFERENCE TO RELATED APPLICATIONS

This application claims priority from Japanese Patent Application No. 2017-044662 filed on Mar. 9, 2017, the entire contents of which are incorporated herein by reference.

TECHNICAL FIELD

The disclosure relates to a vehicle seat in which a rear part of a seat cushion and a rotation-center-side end part of a seat back are in contact with each other, and a manufacturing method thereof.

BACKGROUND

Figure 9:
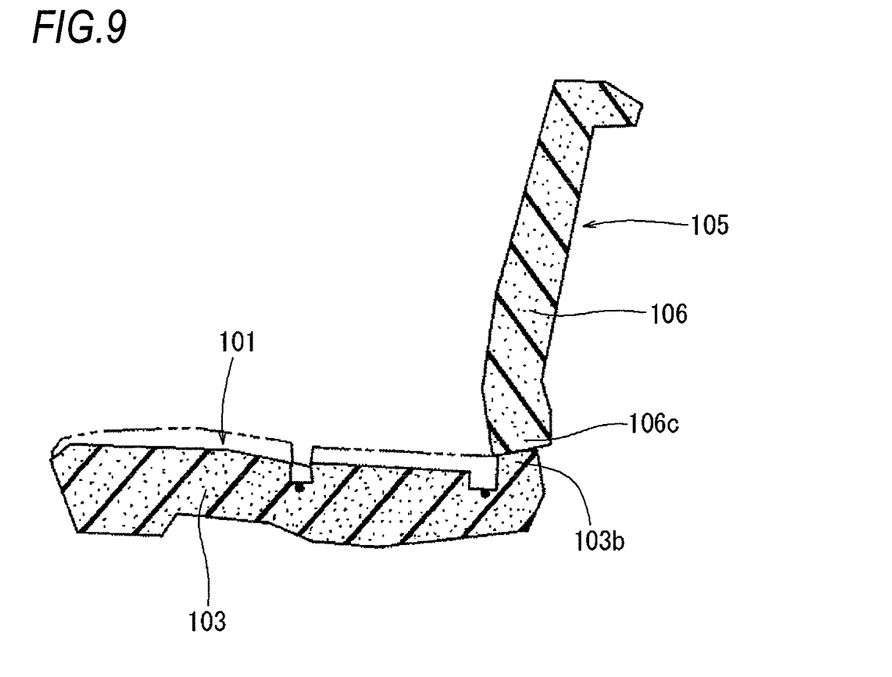
FIG. 9 is a schematic side view of a vehicle seat described in related art.

A vehicle seat is described in Japanese Patent No. 4763275. In the vehicle seat of Japanese Patent No. 4763275, as shown in FIG. 9, a rear part 103b of an elastic body 103 configuring a seat cushion 101 and a rotation-center-side end part 106c of an elastic body 106 configuring a seat back 105 are in contact with each other through covers (not shown). Thus, when the seat back 105 is rotated with respect to the seat cushion 101, a friction force F is generated due to the rubbing of a cover of the seat cushion 101 side with a cover of the seat back 105 side. Here, the friction force F is expressed by the product of a load P at which the cover of the seat back 105 side pushes the cover of the seat cushion 101 side and the coefficient of friction μ between the covers.

In order to improve the holding property of a seated person in the vehicle seat, generally, side parts of both sides of the seat cushion 101 are formed from an elastic body harder than that of a central seating part. In addition, the side parts on both sides of the seat back 105 are formed from an elastic body harder than that of a central backrest part. Thus, at the contact portion of the seat cushion 101 and the seat back 105, the relatively hard elastic bodies are brought into surface contact with each other through the covers at the positions of the left and right side parts. Accordingly, the load P at which the cover of the seat back 105 presses the cover of the seat cushion 101 at the positions of the left and right side parts of the contact portion increases. As a result, the friction force between the seat cushion 101 and the seat back 105 increases, and when the seat back 105 is rotated with respect to the seat cushion 101, the resistance increases.

SUMMARY

The disclosure has been made to solve the above problem, and the problem to be solved by the disclosure is to reduce the friction force at the contact portion between the seat cushion and the seat back so as to make it easy to rotate the seat back with respect to the seat cushion.

According to an aspect of the disclosure, there is provided a vehicle seat including: a seat cushion including: a seating part formed of an elastic body; a side part formed of an elastic body harder than the elastic body forming the seating part; and a rear part; and a seat back including: a backrest part formed of an elastic body; a side part formed of an elastic body harder than the elastic body forming the backrest part; and a rotation-center-side end part; wherein the rear part of the seat cushion and the rotation-center-side end part of the seat back are in contact with each other, and wherein at least one of (i) at least one side portion of the rear part of the seat cushion and (ii) at least one side portion of the rotation-center-side end part of the seat back is formed of an elastic body softer than the elastic body forming the side part of the seat cushion and the elastic body forming the side part of the seat back.

According to another aspect of the disclosure, there is provided a manufacturing method for manufacturing a vehicle seat including: a seat cushion including: a seating part formed of an elastic body; a side part formed of an elastic body harder than the elastic body forming the seating part; and a rear part; and a seat back including: a backrest part formed of an elastic body; a side part formed of an elastic body harder than the elastic body forming the backrest part; and a rotation-center-side end part, the rear part of the seat cushion and the rotation-center-side end part of the seat back being in contact with each other, and at least one of (i) at least one side portion of the rear part of the seat cushion and (ii) at least one side portion of the rotation-center-side end part of the seat back is formed of an elastic body softer than the elastic body forming the side part of the seat cushion and the elastic body forming the side part of the seat back, the method including: foaming a foaming material in a molding die to mold the elastic body having a predetermined shape, a protruding part for forming a partition groove being provided on a molding surface in the molding die, the molding surface forming the surface of the elastic body, and a foaming material which becomes a soft elastic body and a foaming material which becomes a hard elastic body being partitioned from each other by the protruding part.

BRIEF DESCRIPTION OF DRAWINGS

FIG. 5 is a sectional view of a molding die for molding the cushion pad or the like;

DETAILED DESCRIPTION

Embodiment 1

Hereinafter, a vehicle seat according to the first embodiment of the disclosure will be described based on FIGS. 1 to 8. A vehicle seat 10 according to the present embodiment is a seat installed in the interior of a vehicle. Here, front, rear, left, right, upper and lower directions shown in the figure correspond to the front, rear, left, right, upper and lower directions of the vehicle seat 10.

<Summary of the Vehicle Seat 10>

Figure 1:
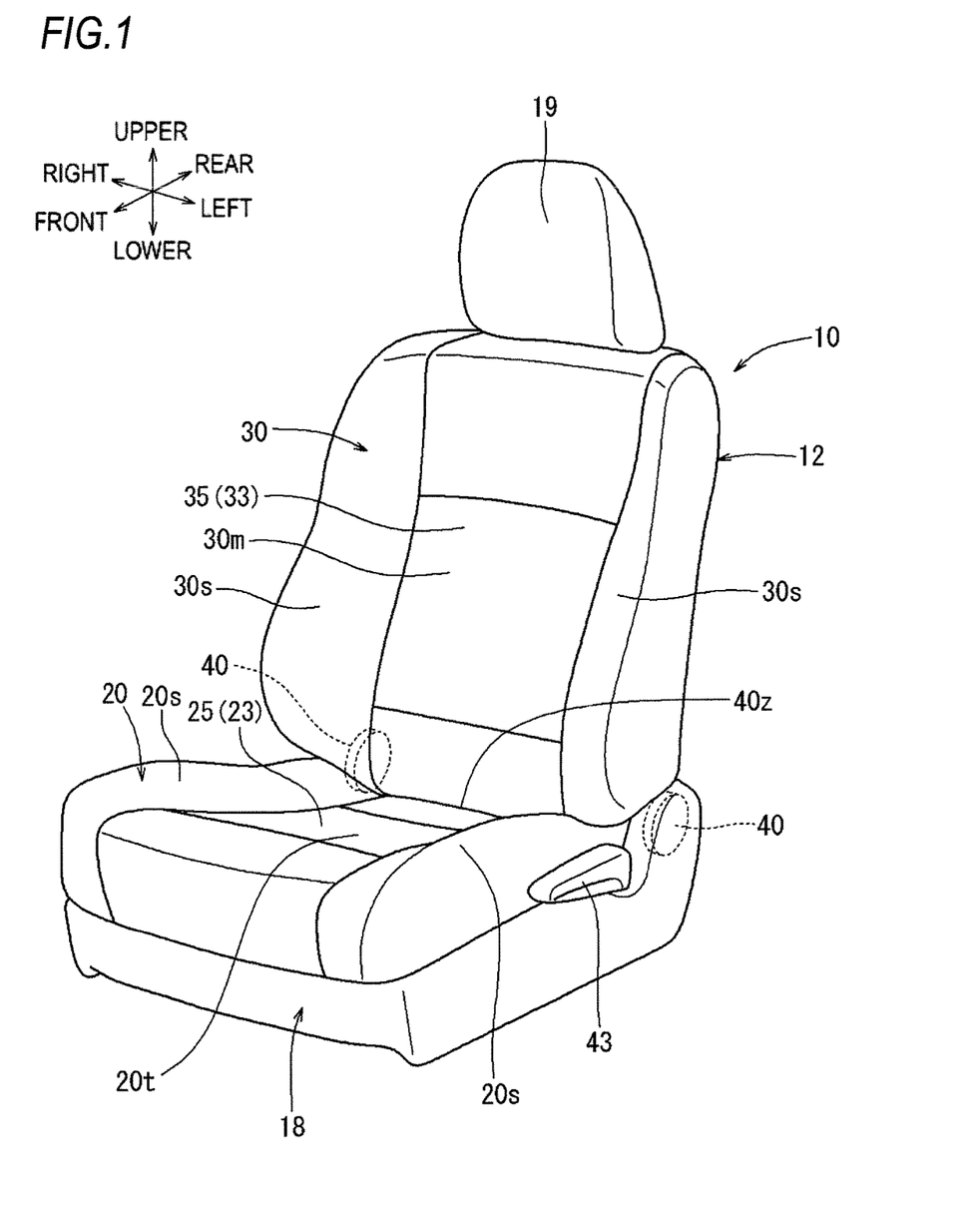
FIG. 1 is a schematic perspective view of a vehicle seat according to the first embodiment of the disclosure when viewed from the front left side.
Figure 2:
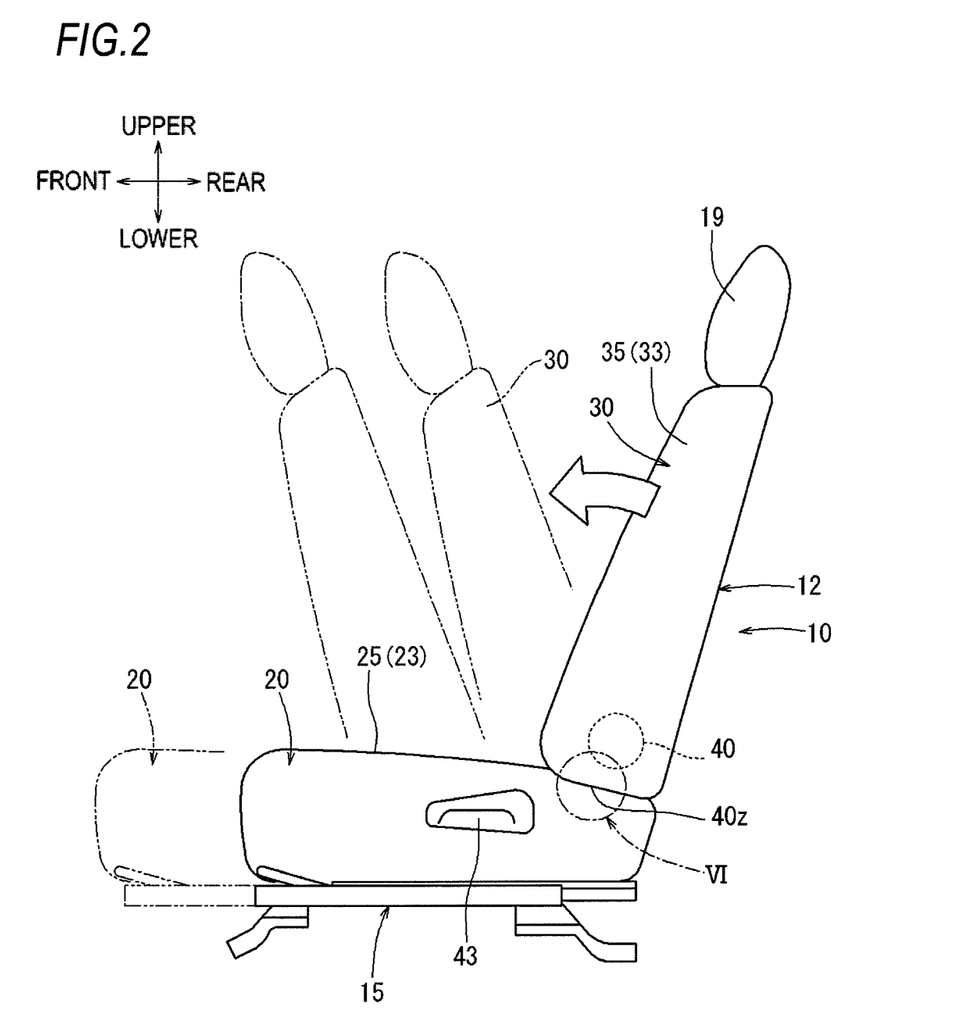
FIG. 2 is a schematic side view of the vehicle seat.

As shown in FIGS. 1 and 2, the vehicle seat 10 includes a seat main body 12 on which an occupant is seated and a seat moving device 15 (see FIG. 2) for sliding the seat main body 12 back and forth, or the like in the interior of the vehicle. A frame-like shield 18 (not shown in FIG. 2) covering the seat moving device 15 is provided on the lower side of the seat main body 12. The seat main body 12 is configured by a seat cushion 20, a seat back 30, a headrest 19, or the like. A rear part of a cushion frame (not shown) of the seat cushion 20 and a lower part of a back frame (not shown) of the seat back 30 are connected through a recliner 40. Accordingly, the seat back 30 can rotate around the axis of the recliner 40 with respect to the seat cushion 20. That is, a seated person can pull an operation lever 43 of the recliner 40 provided on the left side surface of the seat cushion 20 to change the inclination of the seat back 30. Further, a rear part of the seat cushion 20 and a rotation-center-side end part (lower end part) of the seat back 30 are in contact with each other in an elastically deformed state. That is, the boundary between the rear part of the seat cushion 20 and the rotation-center-side end part (lower end part) of the seat back 30 is a contact portion 40z.

<Seat Cushion 20>

The seat cushion 20 is configured by a cushion frame serving as a framework of the seat cushion 20, a cushion pad 23 (see FIG. 3) made of urethane which is an elastic body covering the cushion frame, and a cover 25 covering the surface of the cushion pad 23. As shown in FIG. 1, the seat cushion 20 is provided with a seating part 20t having a flat surface at a predetermined width portion in the center of the width direction, and side parts 20s provided on both left and right sides of the seating part 20t in a state of being raised with respect to the seating part 20t.

Figure 3:
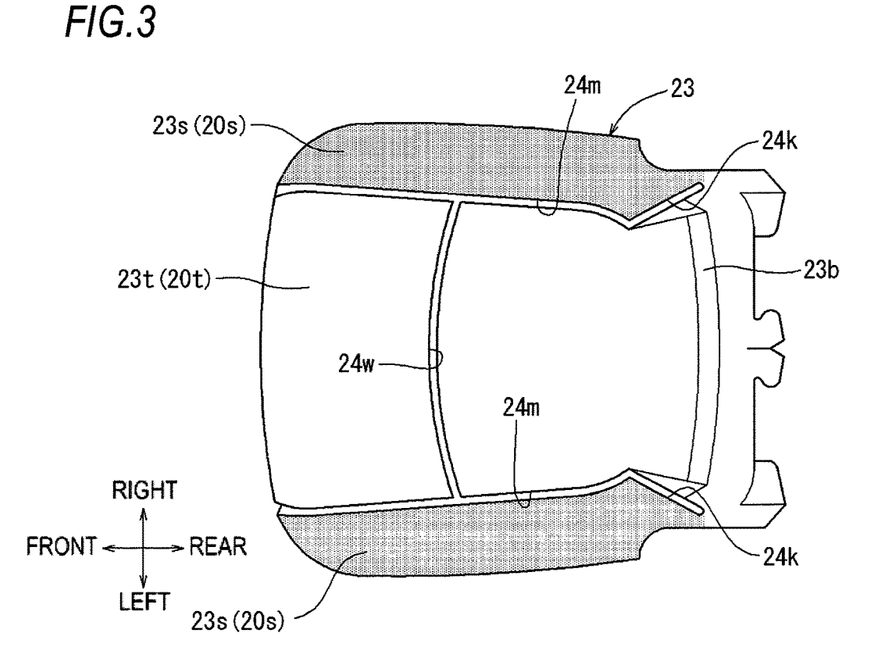
FIG. 3 is a plan view of a cushion pad of the vehicle seat.

As shown in FIG. 3, the seating part 23t (a non-colored portion) of the cushion pad 23 configuring the seating part 20t of the seat cushion 20 is formed of a relatively soft elastic body (urethane). The side parts 23s (non-colored portions) of the cushion pad 23 configuring the side parts 20s of the seat cushion 20 are formed of a relatively hard elastic body (urethane). Further, as shown in FIG. 3, a rear part 23b is provided at a position of the cushion pad 23 on a rear side of the seating part 23t and the side parts 23s. The rear part 23b is formed of a relatively soft elastic body (urethane). That is, side portions on both sides in the width direction of the rear part 23b of the cushion pad 23 are formed of an elastic body having the same softness as the elastic body of the seating part 23t.

As shown in FIG. 3, front-rear grooves 24m for partitioning the seating part 23t of the cushion pad 23 and the left and right side parts 23s are provided on both left and right sides of the surface of the cushion pad 23. Further, oblique grooves 24k for partitioning the left and right side parts 23s of the cushion pad 23 and the left and right side portions of the rear part 23b are provided on both left and right sides of the surface of the cushion pad 23. Further, the seating part 23t of the cushion pad 23 is partitioned in the front-rear direction by a central lateral groove 24w. Here, the front-rear grooves 24m and the oblique groove 24k correspond to the partition groove of the disclosure.

<Seat Back 30>

The seat back 30 is configured by a back frame (not shown) serving as a framework of the seat back 30, a back pad 33 (see FIG. 4) made of urethane which is an elastic body covering the back frame, and a cover 35 covering the surface of the back pad 33. As shown in FIG. 1, the seat back 30 is provided with a backrest part 30m having a flat surface at a predetermined width portion in the center of the width direction, and side parts 30s provided on both left and right sides of the backrest part 30m in a state of being raised with respect to the backrest part 30m.

Figure 4:
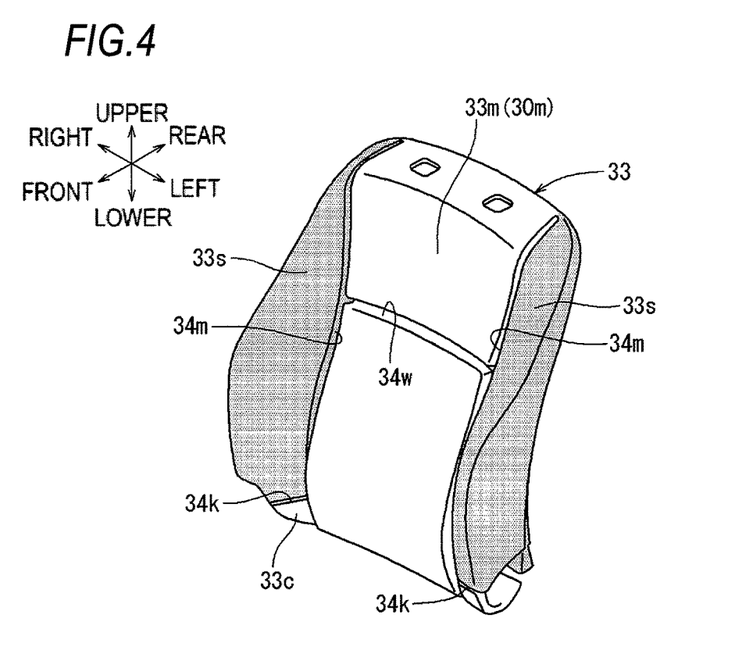
FIG. 4 is a perspective view of a back pad of the vehicle seat when viewed from the front left side.

As shown in FIG. 4, the backrest part 33m (a non-colored portion) of the back pad 33 configuring the backrest part 30m of the seat back 30 is formed of a relatively soft elastic body (urethane). The side parts 33s (colored portions in FIG. 4) of the back pad 33 configuring the side parts 30s of the seat back 30 are formed of a relatively hard elastic body (urethane). Further, as shown in FIG. 4, a rotation-center-side end part 33c (lower end part) is provided at a position of the back pad 33 on a lower side of the backrest part 33m and the side parts 33s. The rotation-center-side end part 33c is formed of a relatively soft elastic body (urethane). That is, side portions on both sides in the width direction of the rotation-center-side end part 33c of the back pad 33 are formed of an elastic body having the same softness as the elastic body of the backrest part 33m.

As shown in FIG. 4, upper-lower grooves 34m for partitioning the backrest part 33m of the back pad 33 and the left and right side parts 33s are provided on both left and right sides of the surface of the back pad 33. Further, lateral grooves 34k for partitioning the left and right side parts 33s of the back pad 33 and the left and right side portions of the rotation-center-side end part 33c are provided on both left and right sides of the surface of the back pad 33. Further, the backrest part 33m of the back pad 33 is partitioned in the upper-lower direction by a central lateral groove 34w. Here, the upper-lower grooves 34m and the lateral grooves 34k correspond to the partition groove of the disclosure.

<Molding Die 50>

Figure 5:
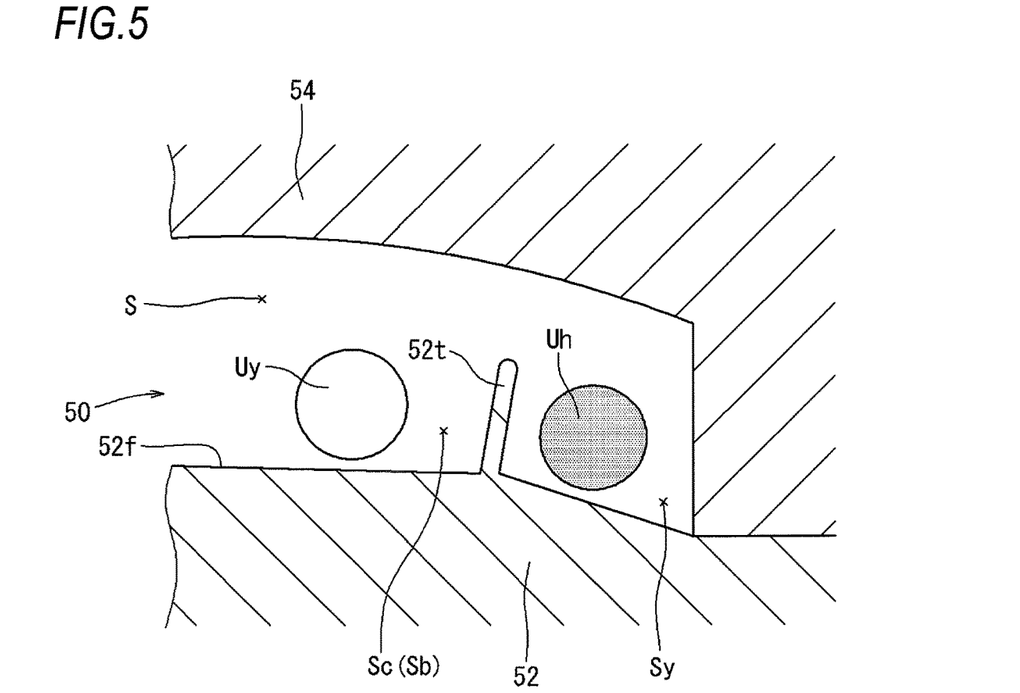

Next, the molding die 50 for molding the cushion pad 23 and the back pad 33 will be described. Here, although the molding die for molding the cushion pad 23 and the molding die for molding the back pad 33 are different in shape, the basic configurations are the same. Thus, the molding die 50 of the cushion pad 23 will be described as a representative example. As shown in FIG. 5, the molding die 50 includes a first metal die 52 for molding the surface side of the cushion pad 23 and a second metal die 54 for molding the back side of the cushion pad 23. By clamping the first metal die 52 and the second metal die 54 of the molding die 50, a molding space S for molding the cushion pad 23 is formed inside the molding die 50. In the first metal die 52 for molding the surface side of the cushion pad 23, a protruding part 52t for molding the front-rear grooves 24m, the oblique grooves 24k, or the like of the cushion pad 23 is provided at a predetermined position of a molding surface 52f for molding the surface of the cushion pad 23.

That is, as shown in FIG. 5, the lower side of the molding space S of the molding die 50 is partitioned into a central portion molding space Sc for molding the seating part 23t of the cushion pad 23 by the protruding part 52t of the first metal die 52 and a side molding space Sy for molding the side parts 23s. The rear molding space Sb for molding the rear part 23b of the cushion pad 23 and the side molding space Sy are partitioned by the protruding part 52t. When the cushion pad 23 is molded, a first foaming material Uy which becomes a relatively soft elastic body (urethane) is set in the central portion molding space Sc and the rear part molding space Sb of the open molding die 50, and a second foaming material Uh which becomes a relatively hard elastic body (urethane) is set in the side molding space Sy. As shown in FIG. 3, by clamping the mold 50, the cushion pad 23, in which the seating part 23t and the rear part 23b are relatively soft and the side parts 23s are relatively hard, is molded. Further, by a similar method, the back pad 33, in which the backrest part 33m and the rotation-center-side end part 33c (lower end part) are relatively soft and the side parts 33s are relatively hard, is molded. Here, the elastic body of the seating part 23t of the cushion pad 23 and the elastic body of the backrest part 33m of the back pad 33 may have the same softness or may have different softness.

<Contact Portion 40z Between the Seat Cushion 20 and the Seat Back 30>

Figure 6:
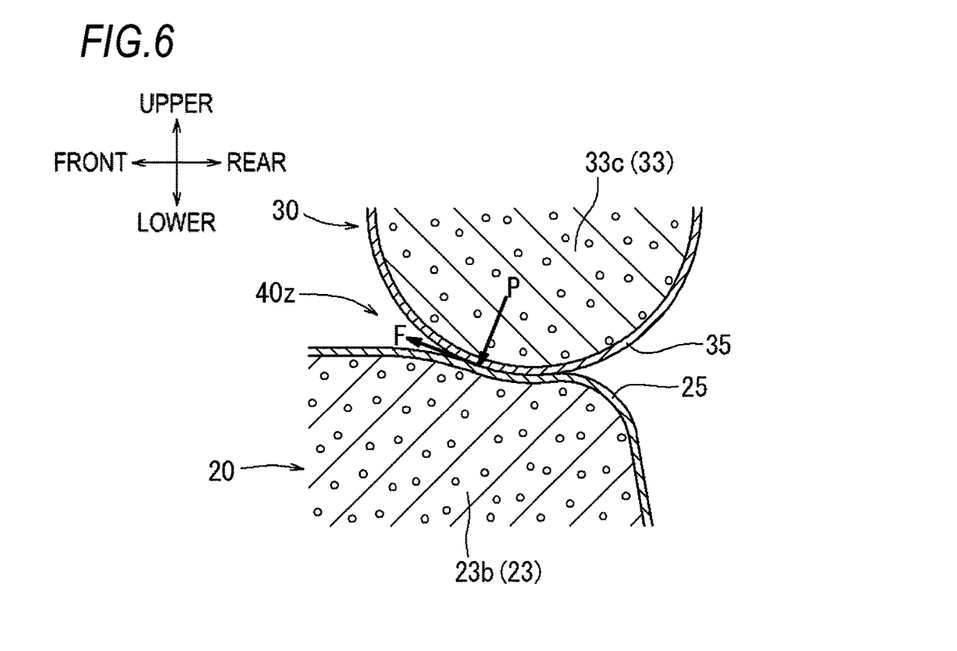
FIG. 6 is a schematic longitudinal sectional view of a contact portion between a side portion of a rear part of the cushion pad and a side portion of a rotation-center-side end part of the back pad (an enlarged longitudinal sectional view taken along an arrow VI in FIG. 2)

As described above, the rear part 23b of the cushion pad 23 and the rotation-center-side end part 33c (lower end part) of the back pad 33 are formed of a relatively soft elastic body (urethane) throughout the entire width direction. That is, as shown in FIG. 6, at the contact portion 40z between the seat cushion 20 and the seat back 30, the cover 25 covering the relatively soft cushion pad 23 (the rear part 23b) is in surface contact with the cover 35 covering the relatively soft back pad 33 (the rotation-center-side end part 33c). Accordingly, the load P by which the cover 35 of the seat back 30 presses the cover 25 of the seat cushion 20 can be reduced. As a result, the friction force F between the seat back 30 and the seat cushion 20 can be reduced, and the seat back 30 becomes easily rotated with respect to the seat cushion 20.

<Advantages of the Vehicle Seat 10 according to the Present Embodiment>

According to the vehicle seat 10 of the present embodiment, the side portions of the rear part of the seat cushion 20 and the side portions of the rotation-center-side end part of the seat back 30, which are in contact with each other, are formed of an elastic body softer than the elastic body forming the side parts 20s and 30s. That is, in the contact portion 40z between the rear part of the seat cushion 20 and the rotation-center-side end part of the seat back 30, relatively hard elastic bodies are not in surface contact through the covers 25 and 35. Thus, the load P at which the cover 35 of the seat back 30 presses the cover 25 of the seat cushion 20 decreases, as compared with the case where the relatively hard elastic bodies are in surface contact through the covers or the like. As a result, the friction force F between the seat cushion 20 and the seat back 30 decreases, and the seat back 30 becomes easily rotated with respect to the seat cushion 20.

Further, in the molding die 50, the protruding part 52t for molding the front-rear grooves 24m, the oblique grooves 24k, or the like is provided on the molding surface 52f forming the surface of the cushion pad 23. Further, the first foaming material Uy which becomes a relatively soft elastic body (urethane) and the second foaming material Uh which becomes a relatively hard elastic body are separated from each other by the protruding part 52t. Thus, it is possible to easily form relatively soft portions and relatively hard portions in one cushion pad 23 (elastic body). In addition, the rear part 23b of the cushion pad 23 is formed of an elastic body having the same softness as the elastic body forming the seating part 23t. Thus, the hardness of the cushion pad 23 can be adjusted in two stages, and the manufacture of the seat cushion 20 becomes easy. Likewise, the rotation-center-side end part 33c of the back pad 33 are formed of an elastic body having the same softness as the elastic body forming the backrest part 33m. Thus, the hardness of the back pad 33 can be adjusted in two stages, and the manufacture of the seat back 30 becomes easy.

Modified Embodiment

Figure 7:
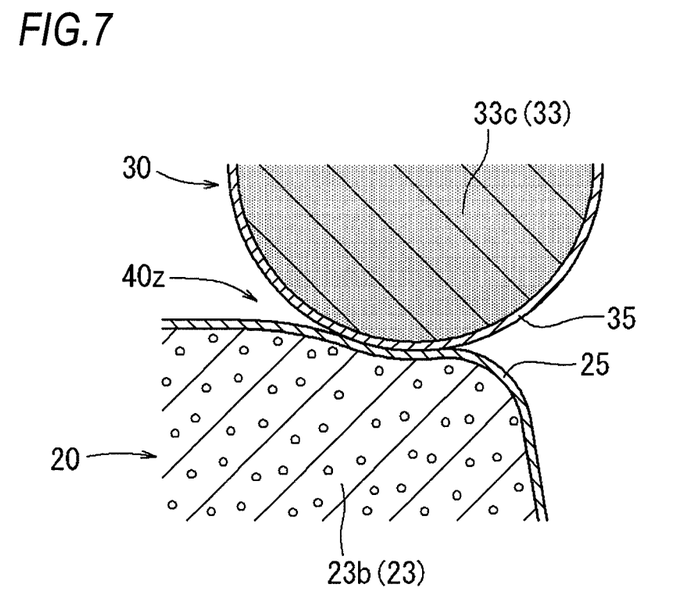
FIG. 7 is a schematic longitudinal sectional view of a contact portion between a side portion of a rear part of a cushion pad and a side portion of rotation-center-side end part of a back pad in a seat vehicle according to a modified embodiment.

Here, the disclosure is not limited to the above-described embodiment, and can be modified without departing from the scope of the disclosure. For example, in the present embodiment, an example in which the rear part 23b of the cushion pad 23 and the rotation-center-side end part 33c (lower end part) of the back pad 33 are formed of a relatively soft elastic body (urethane) throughout the entire width direction is shown. However, among the elastic body forming the side portions of the rear part 23b of the cushion pad 23 and the elastic body forming the side portions of the rotation-center-side end part 33c of the back pad 33, the elastic body having a larger thickness may be softer than the elastic body having a smaller thickness. That is, as shown in FIGS. 3 and 7, even if the rear part 23b of the cushion pad 23 whose elastic body has a larger thickness is formed of a relatively soft elastic body (urethane) over the entire width direction and the side portions of the rotation-center-side end part 33c of the back pad 33 whose elastic body has a smaller thickness are formed of a relatively hard elastic body (urethane) similar to that of the side parts 33s on the upper side, the friction force F is reduced as compared to related art. Additionally, the elastic body having a larger thickness becomes largely recessed, and the positional balance of the contact portion 40z between the seat cushion 20 and the seat back 30 is improved.

Figure 8:
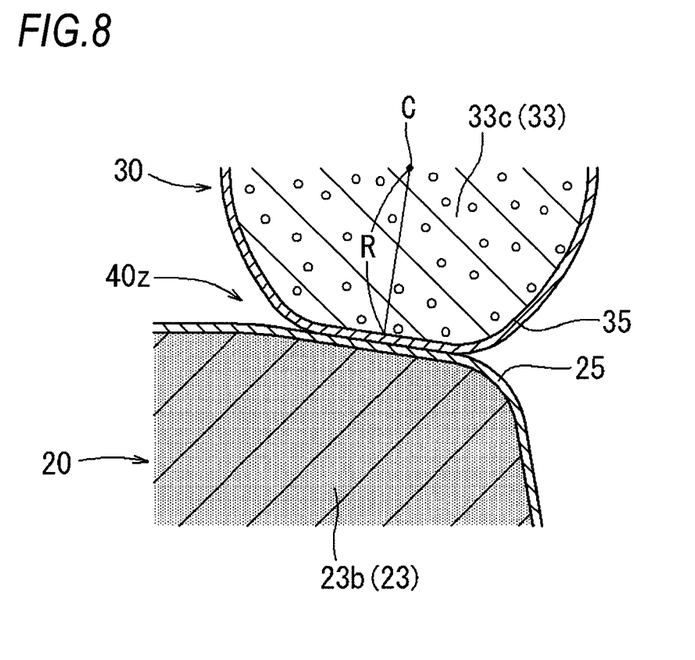
FIG. 8 is a schematic longitudinal sectional view of a contact portion between a side portion of a rear part of a cushion pad and a side portion of rotation-center-side end part of a back pad in a seat vehicle according to another modified embodiment.

Further, as shown in FIGS. 4 and 8, even if the rotation-center-side end part 33c of the back pad 33 is formed of a relatively soft elastic body (urethane) over the entire width direction and the side portions of the rear part 23b in the cushion pad 23 is formed of a relatively hard elastic body (urethane) similar to that of the side parts 23s on the front side, the friction force F is reduced as compared to related art. In this case, the soft rotation-center-side end part 33c of the back pad 33 is recessed more than the rear part 23b of the cushion pad 23. Accordingly, the distance R from the rotation center C of the seat back 30 to the cover 35 is reduced by the amount of the recess. As a result, the moment M=F×R caused by the friction force F becomes small, and the seat back 30 becomes easily rotated when the seat back 30 side is softened compared with when the seat cushion 20 side is softened. Further, even if one of the portions of the rear part of the seat cushion 20 or one of the side portions of the rotation-center-side end part of the seat back 30 is molded from a soft elastic body, the friction force F of the contact portion 40z can be reduced to some extent.

The disclosure provides illustrative, non-limiting examples as follows:

According to a first aspect of the disclosure, there is provided a vehicle seat including: a seat cushion including: a seating part formed of an elastic body; a side part formed of an elastic body harder than the elastic body forming the seating part; and a rear part; and a seat back including: a backrest part formed of an elastic body; a side part formed of an elastic body harder than the elastic body forming the backrest part; and a rotation-center-side end part; wherein the rear part of the seat cushion and the rotation-center-side end part of the seat back are in contact with each other, and wherein at least one of (i) at least one side portion of the rear part of the seat cushion and (ii) at least one side portion of the rotation-center-side end part of the seat back is formed of an elastic body softer than the elastic body forming the side part of the seat cushion and the elastic body forming the side part of the seat back.

Accordingly, at least one of (i) at least one side portion of the rear part of the seat cushion and (ii) the at least one side portion of the rotation-center-side end part of the seat back, which are in contact with each other, is formed of an elastic body softer than the elastic body forming the side part of the seat cushion and the elastic body forming the side part of the seat back. That is, in the contact portion between the rear part of the seat cushion and the rotation-center-side end part of the seat back, relatively hard elastic bodies are not in surface contact through covers or the like. Thus, the load at which the cover of the seat back presses the cover of the seat cushion decreases, as compared with the case where the relatively hard elastic bodies are in surface contact through the covers or the like. As a result, the friction force between the seat cushion and the seat back decreases, and the seat back becomes easily rotated with respect to the seat cushion.

According to a second aspect of the disclosure, there is provided the vehicle seat according to the first aspect, wherein the at least one side portion of the rear part of the seat cushion includes side portions on both sides of the rear part of the seat cushion, wherein the at least one side portion of the rotation-center-side end part of the seat back includes side portions on both sides of the rotation-center-side end part of the seat back, and wherein at least one of (i) the side portions on both sides of the rear part of the seat cushion and (ii) the side portions on both sides of the rotation-center-side end part of the seat back is formed of the elastic body softer than the elastic body forming the side part of the seat cushion and the elastic body forming the side part of the seat back.

According to a third aspect of the disclosure, there is provided the vehicle seat according to the first or second aspect, wherein the elastic body forming the at least one side portion of the rear part of the cushion pad and the elastic body forming the seating part have the same softness. Thus, the hardness of the elastic body configuring the seat cushion can be adjusted in two stages, and the manufacture of the seat cushion becomes easy.

According to a fourth aspect of the disclosure, there is provided the vehicle seat according to any one of the first to third aspects, wherein the elastic body forming the at least one side portion of the rotation-center-side end part of the seat back and the elastic body forming the backrest part have the same softness. Thus, the hardness of the elastic body configuring the seat back can be adjusted in two stages, and the manufacture of the seat cushion becomes easy.

According to a fifth aspect of the disclosure, there is provided the vehicle seat according to any one of the first to fourth aspects, wherein, among the elastic body forming the at least one side portion of the rear part of the seat cushion and the elastic body forming the at least one side portion of the rotation-center-side end part of the seat back, the elastic body having a larger thickness is softer than the elastic body having a smaller thickness. Thus, the elastic body having a larger thickness is recessed, and the positional balance of the contact portion between the seat cushion and the seat back is improved.

According to a sixth aspect of the disclosure, there is provided the vehicle seat according to any one of the first to fifth aspects, wherein the elastic body forming the at least one side portion of the rotation-center-side end part of the seat back is softer than the elastic body forming the at least one side portion of the rear part of the seat cushion. Thus, the at least one side portion of the rotation-center-side end part of the seat back becomes recessed larger than the as least one side portion of the rear part of the seat cushion. Accordingly, a radius from the rotation center of the seat back to the cover of the seat back becomes small, and thus the rotational torque caused by the friction force becomes small. As a result, the seat back becomes easily rotated with respect to the seat cushion.

According to a seventh aspect of the disclosure, there is provided the vehicle seat according to any one of the first to sixth aspects, wherein, on a surface of an elastic body configuring the seat cushion, a partition groove is formed between the at least one side portion of the rear part of the seat cushion and the side part of the seat cushion. Thus, the relatively soft elastic body and the relatively hard elastic body are separated from each other by the partition groove.

According to an eighth aspect of the disclosure, there is provided the vehicle seat according to any one of the first to seventh aspects, wherein, on a surface of an elastic body configuring the seat back, a partition groove is formed between the at least one side portion of the rotation-center-side end part of the seat back and the side part of the seat back. Thus, the relatively soft elastic body and the relatively hard elastic body are separated from each other by the partition groove.

According to a ninth aspect of the disclosure, there is provided a manufacturing method for manufacturing a vehicle seat including: a seat cushion including: a seating part formed of an elastic body; a side part formed of an elastic body harder than the elastic body forming the seating part; and a rear part; and a seat back including: a backrest part formed of an elastic body; a side part formed of an elastic body harder than the elastic body forming the backrest part; and a rotation-center-side end part, the rear part of the seat cushion and the rotation-center-side end part of the seat back being in contact with each other, and at least one of (i) at least one side portion of the rear part of the seat cushion and (ii) at least one side portion of the rotation-center-side end part of the seat back is formed of an elastic body softer than the elastic body forming the side part of the seat cushion and the elastic body forming the side part of the seat back, the method including: foaming a foaming material in a molding die to mold the elastic body having a predetermined shape, a protruding part for forming a partition groove being provided on a molding surface in the molding die, the molding surface forming the surface of the elastic body, and a foaming material which becomes a soft elastic body and a foaming material which becomes a hard elastic body being partitioned from each other by the protruding part. Thus, it is possible to easily form a soft portion and a hard portion in one elastic body.

According to the disclosure, since the friction force of the contact portion between the seat cushion and the seat back is reduced, the seat back becomes easily rotated with respect to the seat cushion.

What is claimed is:
1. A vehicle seat comprising:
a seat cushion including:
a seating part formed of an elastic body;
a side part formed of an elastic body harder than the elastic body forming the seating part; and
a rear part; and
a seat back including:
a backrest part formed of an elastic body;
a side part formed of an elastic body harder than the elastic body forming the backrest part; and
a rotation-center-side end part;

wherein the rear part of the seat cushion and the rotation-center-side end part of the seat back are in contact with each other, and wherein at least one of (i) at least one side portion of the rear part of the seat cushion and (ii) at least one side portion of the rotation-center-side end part of the seat back is formed of an elastic body softer than the elastic body forming the side part of the seat cushion and the elastic body forming the side part of the seat back.

2. The vehicle seat according to claim 1, wherein the at least one side portion of the rear part of the seat cushion includes side portions on both sides of the rear part of the seat cushion, wherein the at least one side portion of the rotation-center-side end part of the seat back includes side portions on both sides of the rotation-center-side end part of the seat back, and wherein at least one of (i) the side portions on both sides of the rear part of the seat cushion and (ii) the side portions on both sides of the rotation-center-side end part of the seat back is formed of the elastic body softer than the elastic body forming the side part of the seat cushion and the elastic body forming the side part of the seat back.

3. The vehicle seat according to claim 1, wherein the elastic body forming the at least one side portion of the rear part of the cushion pad and the elastic body forming the seating part have the same softness.

4. The vehicle seat according to claim 1, wherein the elastic body forming the at least one side portion of the rotation-center-side end part of the seat back and the elastic body forming the backrest part have the same softness.

5. The vehicle seat according to claim 1, wherein, among the elastic body forming the at least one side portion of the rear part of the seat cushion and the elastic body forming the at least one side portion of the rotation-center-side end part of the seat back, the elastic body having a larger thickness is softer than the elastic body having a smaller thickness.

6. The vehicle seat according to claim 1, wherein the elastic body forming the at least one side portion of the rotation-center-side end part of the seat back is softer than the elastic body forming the at least one side portion of the rear part of the seat cushion.

7. The vehicle seat according to claim 1, wherein, on a surface of an elastic body configuring the seat cushion, a partition groove is formed between the at least one side portion of the rear part of the seat cushion and the side part of the seat cushion.

8. The vehicle seat according to claim 1, wherein, on a surface of an elastic body configuring the seat back, a partition groove is formed between the at least one side portion of the rotation-center-side end part of the seat back and the side part of the seat back.

* * * * *